April 14, 1964 H. M. MUIR 3,129,056

PROCESS FOR PRODUCING RARE EARTH SELENIDES AND TELLURIDES

Filed April 1, 1960

INVENTOR.
HUBERT M. MUIR
BY Karl Huber
James E. Buyan
Alan C. Rose
ATTORNEYS

United States Patent Office 3,129,056

Patented Apr. 14, 1964

3,129,056

PROCESS FOR PRODUCING RARE EARTH SELENIDES AND TELLURIDES

Hubert M. Muir, Sunland, Calif., assignor to Nuclear Corporation of America, Denville, N.J., a corporation of Delaware Filed Apr. 1, 1960, Ser. No. 19,406

2 Claims. (Cl. 23—50)

This invention relates rare earth-selenium and rare earth-tellurium materials, to thermocouples, to thermoelectric materials, and to methods for making the materials.

In accordance with one aspect of the present invention it has been determined that gadolinium-selenium compositions have good thermoelectric properties. Thus, for specific example, a gadolinium-selenium intermetallic compound of a composition approximating the chemical formula $Gd_2Se_3$ has a "thermoelectric power," referring to the Seebeck coefficient, of more than 400 microvolts per degree centigrade at eight hundred degrees centigrade, which is among the highest thermoelectric powers yet determined for any material.

In accordance with one feature of the invention, therefore, a thermoelectric device has one thermoelement formed of a gadolinium-selenium composition.

In early attempts to fabricate materials, such as gadolinium-selenium compositions, the violent or explosive reaction has caused some difficulty. In accordance with one aspect of the present invention, it has been determined that a controlled reaction may be provided by an initial vapor reaction of the two elements. Thus, for either gadolinium-selenium or gadolinium-tellurium compositions, the two elements in particulate form may be sealed in a tube. The tube may be of quartz or Vycor glass, and is preferably sealed off at a low pressure. In the vapor reaction of the two elements, the sealed tube or chamber may be heated gradually over a prolonged period. The reaction products, in powered form, are then compressed under high pressure into pellets. Subsequently, the pellets are arc melted in an inert atmosphere.

In accordance with another feature of the invention, therefore, selenium or tellurium may be reacted with one or more of the rare earth metals, such as gadolinium, by sealing the two elements in divided form in a chamber, heating the chamber gradually for a prolonged period to vapor-react the two elements, pressing the powered reaction products into pellets, and melting the pellets, preferably in an inert atmosphere.

Figure 1:
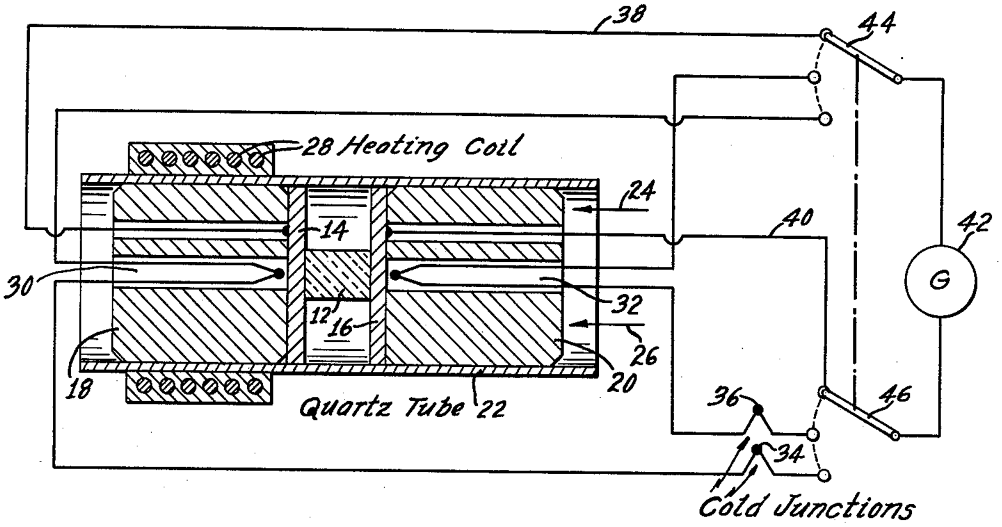
Figure 2:
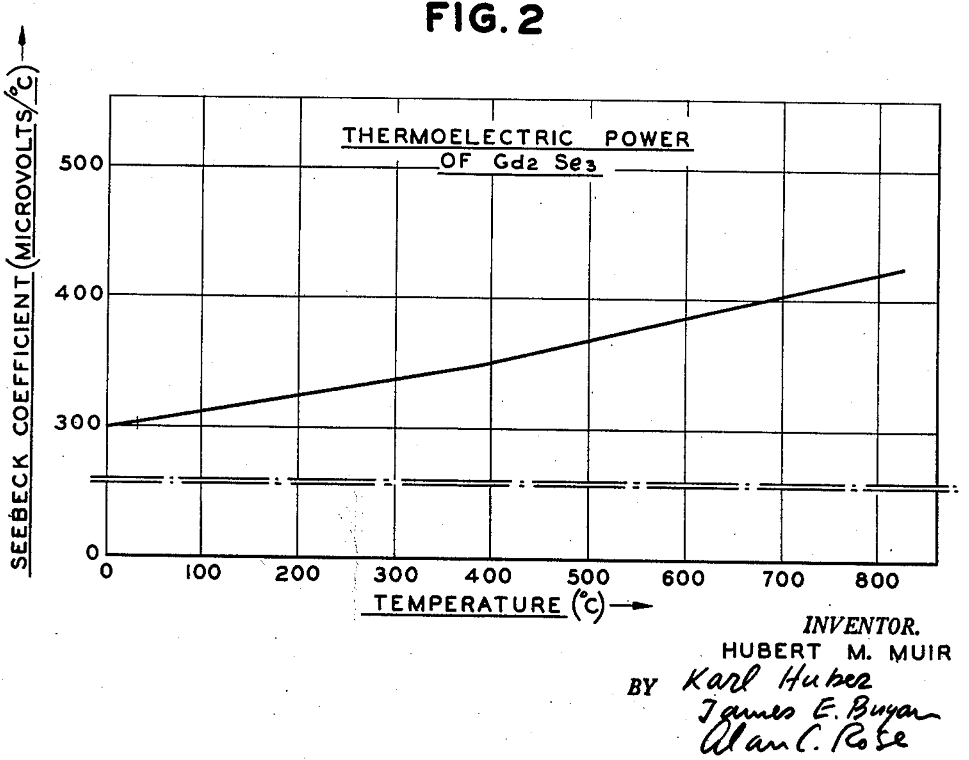

Other objects, features and advantages of the invention will become apparent from a consideration of the following detailed description, and from the drawings, in which:

FIGURE 1 is a diagram of a thermoelectric system in accordance with the present invention; and FIGURE 2 is a plot showing the thermoelectric power of a gadolinium-selenium thermoelectric element.

With reference to the drawings, FIGURE 1 shows an arrangement for measuring the thermoelectric power developed by a sample 12 of a gadolinium-selenium intermetallic compound, having a nominal composition of $Gd_2Se_3$. In the apparatus of FIGURE 1, the sample 12 is clamped between two plates 14 and 16 of platinum material. Stainless steel rods 18 and 20 are resiliently biased toward the platinum plates 14 and 16 respectively, by springs (not shown), to clamp the plates against the sample.

A tube 22 of quartz, Vycor, or the like encloses the sample 12, the plates 14 and 16, and the stainless steel rods 18 and 20 mentioned above. "Vycor" is a trade name of Corning Glass Works, which designates a high silica glass for high temperature applications. An inert gas, which in this case may be argon, is passed through the tube 22 in the direction indicated by arrows 24 and 26. The heating coil 28 is provided around the tube 22 at its left hand end as shown in FIGURE 1. By means of the heating coil, the junction of sample 12 and the platinum plate 14 is raised to a much higher temperature than the junction of sample 12 with platinum plate 16. The difference in temperature at the two junctions is measured by the Chromel-Alumel thermocouples 30 and 32. Any other suitable form of calibrated thermocouple can also be employed.

The "hot" junction of each of the thermocouples 30 and 32 is located adjacent one of the plates 14, 16 and the "cold" junctions 34 and 36 of the thermocouples are both at the prevailing ambient temperature outside the apparatus. It is understood, of course, that the "hot" junction of thermocouple 32 is considerably cooler than the "hot" junction of thermocouple 30.

Connections with the thermocouple including the platinum plates 14 and 16 and the sample 12 are made by soldering conductors 38 and 40 to the two platinum plates 14 and 16, respectively. The thermoelectric potential which is developed at the various thermocouples is measured by a sensitive galvanometer 42. Associated with the galvanometer 42 is a switch having mechanically linked blades 44 and 46. In the position shown in FIGURE 1 the voltage output from the thermocouple including sample 12 and the platinum plates is being measured. In the other two positions of the switch blades 44, 46, the output signals from the Chromel-Alumel thermocouples 30 and 32 are measured. These measurements indicate the temperature of the hot and cold junctions of the thermocouple including the sample 12. By changing the power supplied to the heating coil 28, the thermoelectric output power from sample 12 may be measured at various temperature levels.

FIGURE 2 is a plot of the thermoelectric power of a sample of gadolinium-selenium material at various temperatures. The thermoelectric power of the gadolinium-selenium sample increases significantly from room temperature to 800° C. Thus, the power, as indicated by the Seebeck coefficient, is more than 400 microvolts per degree centigrade. This is a relatively high coefficient, and is higher than that of most thermoelectric materials at this temperature.

In the following three tables, data obtained in the course of various experiments on gadolinium-selenium compounds are set forth. In Table I the actual gadolinium content of various samples which were employed is compared with the stoichiometric gadolinium content for each of the intermetallic compounds. In Table II the density and the melting point of the samples are set forth. Table III gives the thermoelectric power for each of three gadolinium-selenium compounds at each of three temperatures.

*Table I*

| Nominal Compound (Arc Melted) | Composition | |
|---|---|---|
| | Nominal, percent Gd | Actual, percent Gd |
| $Gd_2Se_3$ | 57.0 | 56.7 |
| $Gd_3Se_4$ | 59.8 | 60.6 |
| GdSe | 66.5 | 66.6 |

*Table II*

| Nominal Compound (Arc Melted) | Density (g./cc.) | Melting Point (±25° C.) |
|---|---|---|
| | | Degrees |
| $Gd_2Se_3$ | 7.365 | 1,700 |
| $Gd_3Se_4$ | 7.087 | 1,700 |
| $GdSe$ | 7.370 | 1,600 |

*Table III*

| Nominal Compound | Seebeck Coefficient (microvolts/° C.) | | |
|---|---|---|---|
| | 30° C. | 400° C. | 800° C. |
| $Gd_2Se_3$ | 300 | 350 | 420 |
| $Gd_3Se_4$ | 40 | 40 | 48 |
| $GdSe$ | 28 | 21 | 17 |

In the formation of selenium and gadolinium compositions, it has been determined that a vapor diffusion reaction technique is to be preferred over the more violent reactions which were initially employed. In one case the reaction was effected in a length of glass tubing having a one-half inch outer diameter and a 1/16 inch thick outer wall. After one end of the tubing was sealed gadolinium was introduced into the tube in the form of chips of approximately 1/32 inch cube size. A constriction was then drawn by melting the tube above the layer of metallic gadolinium. Selenium in 1/16 inch diameter pellets was then introduced on the other side of the constriction. Direct solid contact of the reactants was thus prevented. After evacuating the system to a pressure of 3 to 5 microns of mercury, the open end of the tube was sealed off and the tube containing the gadolinium and selenium was inserted into a combustion furnace having a 1½ inch outer diameter.

The furnace temperature was then slowly increased at a rate of about approximately 100° C. per hour up to 900° C. This temperature was maintained for about 24 hours when the power input to the furnace was discontinued. The system including the furnace and the tube within the furnace was then cooled to room temperature at a rate of about 200° C. per hour.

By providing a slower rate of reaction and by the technique of vapor diffusion, better control is obtained and the explosive reaction which occurs when gadolinium-selenium systems are reacted directly at high temperatures is avoided.

Following the diffusion reaction, the gadolinium-selenium compounds are obtained as powders. These powders are consolidated and homogenized by blending and pelletizing at pressures of 10,000 to 15,000 pounds per square inch. The resulting pellets were approximately 1¼ inch in diameter and 1½ inch thick.

The pellets may be melted by arc melting in an inert atmosphere with a non-consumable tungsten electrode and a water cooled copper crucible. In one illustrative process, the arc melting furnace was first pumped down to a pressure of about 30 to 50 microns of mercury and then purged with argon. This cycle was repeated twice to insure a high purity atmosphere. After the second purging, the furnace was filled with argon at a pressure of 1 to 3 pounds per square inch. The pellets were then melted by the application of current between the tungsten electrode and the pellet within the copper crucible, in accordance with the usual arc melting procedure. The precise arc melting procedure described above is not critical; thus, the arc melting process may be carried out in accordance with the example set forth in the copending patent application No. 823,812 of Bernard Love, filed June 30, 1959, and entitled "Purification of Beryllium."

The vapor reaction step in the process may also be accomplished in accordance with a slightly different technique. In accordance with this alternative technique, fine turnings of high purity gadolinium metal are blended with pelletized selenium material and sealed in Vycor tubing with an inert atmosphere of argon at a pressure of approximately 30 to 50 microns of mercury. The vapor reaction cycle includes an initial step of heating the gadolinium and selenium to 500° C. at a rate of about 100° C. per hour and holding the temperature for 8 hours. Following completion of this step the temperature is raised against a rate of 100° C. per hour until 900° C. is reached. This temperature is maintained for about 16 hours, after which the system including the furnace is allowed to cool to room temperature before further processing. The subsequent step of pressing into pellets at high pressure without the use of a binder is again followed. The resulting samples of gadolinium-selenium intermetallic systems, following the final arc melting step, exhibit good homogeneity, Concerning variants on the examples set forth above, the proportions of gadolinium and selenium, may be varied from a few percent of gadolinium to a few percent of selenium, with the balance principally being gadolinium. In the vapor reaction step, the rate of temperature increase must be below the level at which explosive reaction will take place for the proportions of the materials which are employed. The holding times should be sufficiently long to provide moderately complete reaction of the components, and will depend on the particle size of the elements which are being reacted.

Both the vapor reaction and the arc melting steps are preferably performed at subatmospheric pressures. In the case of the vapor reaction, relatively lower pressures in the order of less than 100 millimeters of mercury are to be preferred. When pressures greater than a few millimeters of mercury are employed in either step, an inert gas such as argon should be used for back filling.

While the foregoing process has been described with reference to gadolinium, homogeneous compositions of the other rare earth metals and selenium may be prepared in accordance with the same methods. The rare earth materials include the elements of atomic number 57 through 71. One of the group, promethium, atomic number 61, does not occur naturally, but is a fission product. Scandium and yttrium, atomic numbers 21 and 39, occur together with the rare earths in nature, and are also group III–A elements. These last two elements are therefore generally included in the term "rare earths" and are so included in the present specification and claims. Furthermore, tellurium may be substituted for selenium in the process described above, either with gadolinium or with the other rare earth materials.

The resultant compositions of rare earth materials with selenium or tellurium may be used as thermoelectric elements, infrared detectors, filters, components of high temperature solar batteries, as photo-conductor materials, or as cathode emitting materials, for example.

It is to be understood that the above described arrangements are illustrative of the application of the principles of the invention. Numerous other arrangements may be devised by those skilled in the art without departing from the spirit and scope of the invention.

What is claimed is:

1. A method of preparing a gadolinium selenide compound, comprising sealing gadolinium and selenium in divided form in a chamber containing an inert gas at a pressure materially below atmospheric, gradually and slowly raising the temperature of the chamber for a period of several hours to generate vapors and cause a slow, controlled and non-explosive vapor reaction to take place between the two elements, maintaining the temperature of the chamber for a prolonged period of time sufficiently high to substantially complete the reaction, thereafter gradually cooling the chamber, removing the resulting powdered reaction product from the chamber, homogenizing and pressing the resulting powdered reaction product into pellets and arc melting the pellets in an inert atmosphere.

2. A method for preparing a gadolinium selenide compound, comprising separately placing gadolinium and selenium in a chamber out of contact with each other, evacuating the chamber and sealing the same, and while said materials are out of contact, gradually and slowly raising the temperature of the chamber substantially uniformly throughout its extent for a period of several hours to generate vapors and cause a slow, controlled and non-explosive vapor reaction to take place between the two elements, maintaining the temperature of the chamber sufficiently high for a time sufficient to substantially complete the reaction, thereafter gradually cooling the chamber, removing the resulting powdered reaction product from the chamber, pelletizing the powder and arc melting the pellets.

References Cited in the file of this patent

UNITED STATES PATENTS

| | | |
|---|---|---|
| 2,762,857 | Lindenblad | Sept. 11, 1956 |
| 2,788,382 | Faus | Apr. 9, 1957 |
| 2,893,831 | Bither | July 7, 1959 |
| 2,921,834 | Benzing | Jan. 19, 1960 |
| 2,929,678 | Zalm | Mar. 22, 1960 |
| 2,944,975 | Folberth | July 12, 1960 |
| 2,978,661 | Miller et al. | Apr. 4, 1961 |

OTHER REFERENCES

Mellor: Comprehensive Treatise on Inorganic and Theoretical Chemistry, Longmans, Green and Company, New York, vol. 5, pages 603 and 681 (1924).